United States Patent [19]

Handy

[11] 4,396,068
[45] Aug. 2, 1983

[54] SOIL PREPARATION IMPLEMENT

[76] Inventor: Barry L. Handy, Box 2520, Scobey, Mont. 59263

[21] Appl. No.: 371,514

[22] Filed: Apr. 23, 1982

Related U.S. Application Data

[63] Continuation-in-part of Ser. No. 285,603, Jul. 21, 1981.

[51] Int. Cl.³ .................... A01B 39/19; A01B 5/06
[52] U.S. Cl. .................................. 172/44; 111/85; 111/60; 111/125; 111/311; 111/629; 111/606
[58] Field of Search .................... 172/44, 60, 125, 311, 172/456, 624, 624.5, 629, 606; 474/117, 136–138; 111/85–88

[56]  References Cited

U.S. PATENT DOCUMENTS

| | | | |
|---|---|---|---|
| 1,673,762 | 6/1928 | Chapman | 474/138 |
| 1,974,869 | 9/1934 | Hotto | 172/624 |
| 2,157,702 | 5/1939 | Hoke | 172/624 |
| 2,249,637 | 7/1941 | Rietz | 111/85 |
| 3,033,294 | 5/1962 | Edwards | 172/44 |
| 3,108,642 | 10/1963 | Hunter | 172/44 |
| 3,166,947 | 1/1965 | Hendershot | 474/137 |
| 3,186,494 | 6/1965 | Jackson | 172/44 |
| 3,200,778 | 8/1965 | Whelchel | 111/85 |
| 3,443,645 | 5/1969 | Edwards | 172/44 |
| 3,576,213 | 4/1971 | Hall | 172/44 |
| 3,651,870 | 3/1972 | Calkins | 172/44 |
| 3,749,177 | 7/1973 | Keyser et al. | 172/44 |
| 3,768,425 | 10/1973 | Seifert, Jr. | 172/44 X |
| 4,121,669 | 10/1978 | Sosalla | 172/624.5 X |
| 4,171,723 | 10/1979 | Hood et al. | 172/44 X |
| 4,196,679 | 4/1980 | Moore | 111/85 |

FOREIGN PATENT DOCUMENTS

| | | | |
|---|---|---|---|
| 840124 | 4/1970 | Canada | 172/44 |
| 180048 | 6/1966 | U.S.S.R. | 474/117 |

*Primary Examiner*—Paul E. Shapiro
*Attorney, Agent, or Firm*—Harvey B. Jacobson

[57]  ABSTRACT

An upstanding housing is provided and mounted in trailing relation to a depending tool shank by generally horizontal upper and lower pivot links having their forward ends pivotally supported from the tool shank and their rear ends pivotally supported from the housing. A driven power shaft is journaled in the upper portion of the housing and an output shaft is journaled in the lower portion of the housing. A chain is trained about sprocket wheels mounted on the shafts and has a spring biased idler sprocket wheel is engaged with one reach thereof for tensioning the chain. A rod weeder shaft has one end supported from the output shaft and additional laterally spaced depending tool shanks include trailing journal structures mounted for limited vertical shifting relative thereto and the rod weeder shaft has longitudinally spaced portions thereof journaled by the journal structures. Front-to-rear extending connecting links are pivotally connected between the journal structures and the corresponding tool shank lower end portions and the journal structures include laterally spaced mounting flanges having vertically spaced transverse bores formed therethrough in which pivot pins are received for selective vertical adjustment of the pivot connections between the journal structures and the rear ends of the links and the link rear end portions include the pending tang portions oscillatable with the links to prevent soil buildup between the mounting flanges.

9 Claims, 13 Drawing Figures

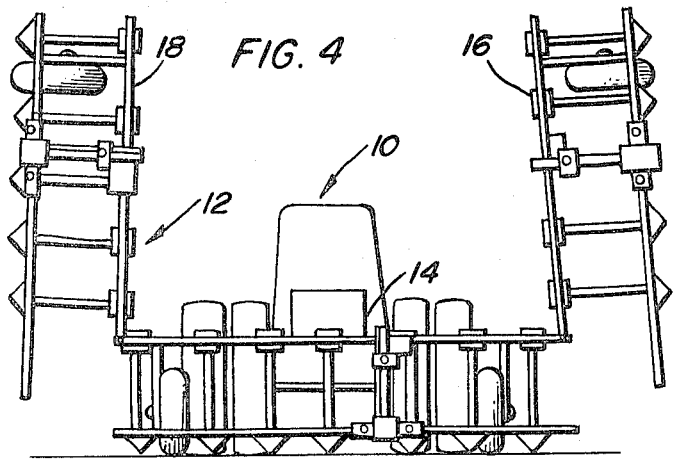
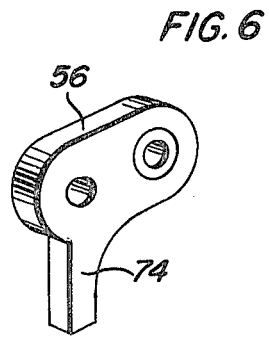
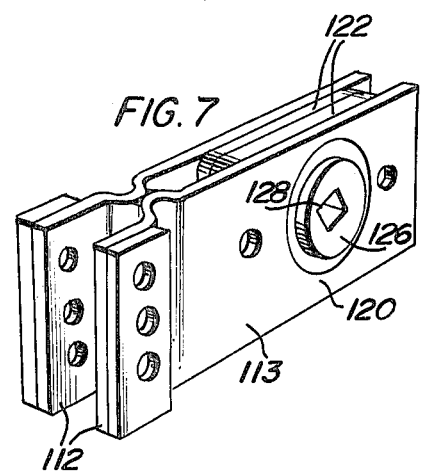
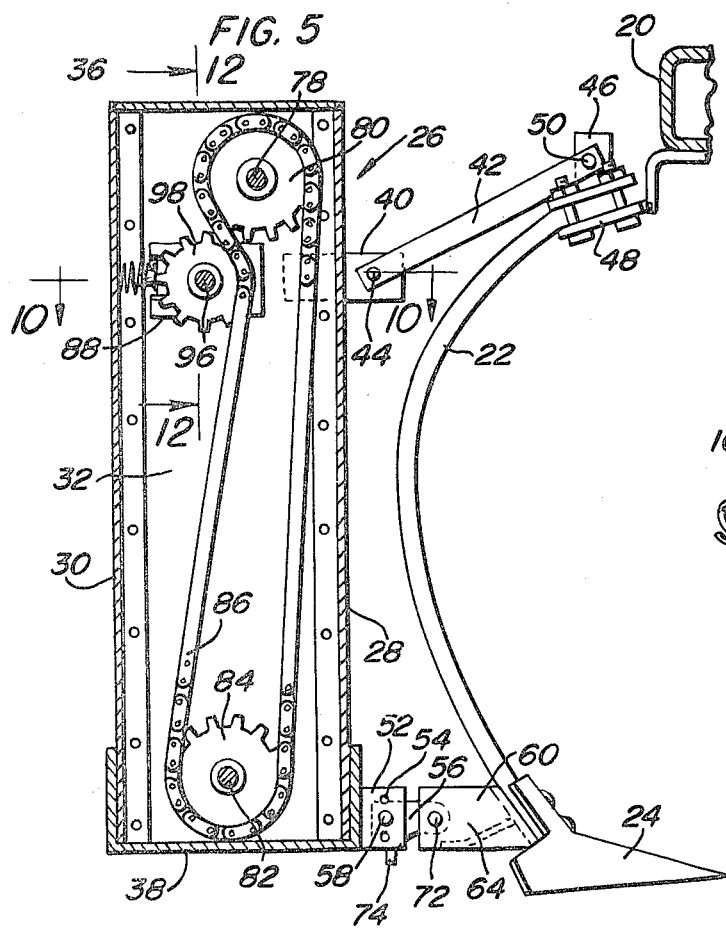
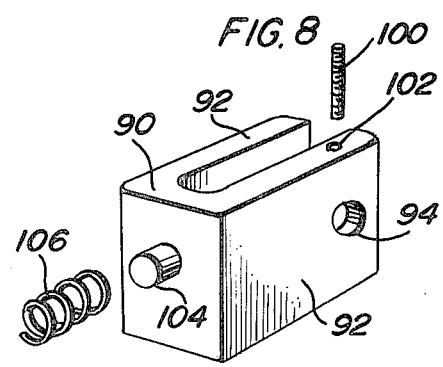
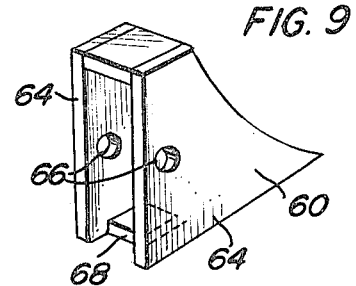

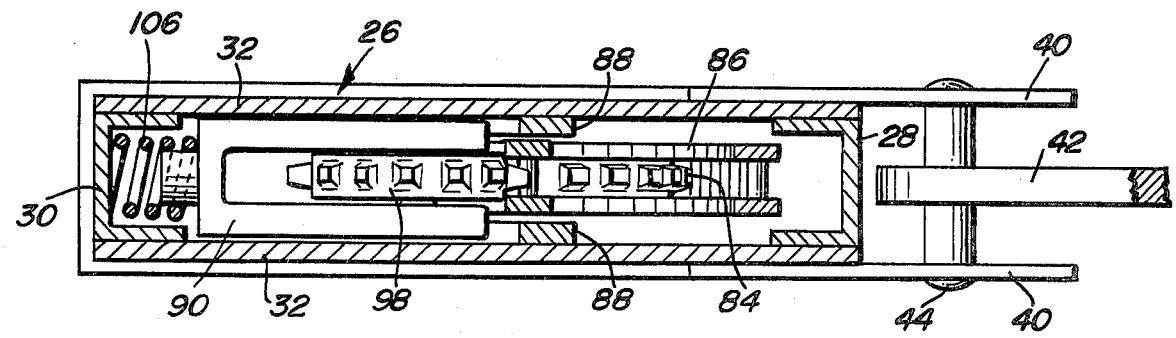
FIG. 10
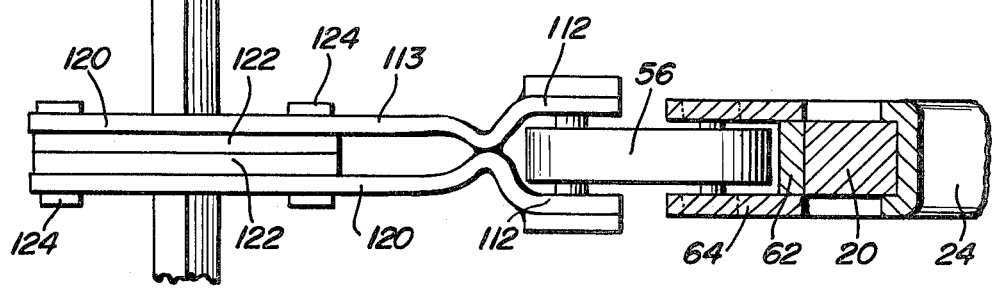
FIG. 11
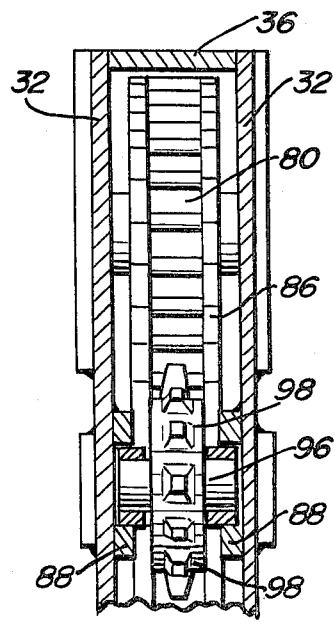
FIG. 12
FIG. 13

4,396,068

SOIL PREPARATION IMPLEMENT

CROSS-REFERENCE TO RELATED APPLICATION

This application comprises a continuation-in-part of my co-pending U.S. application Ser. No. 285,603, for "Floating Rod Weeder," filed July 21, 1981.

BACKGROUND OF THE INVENTION

Various forms of rod weeders heretofore have been provided for use in conjunction with various ground preparation implements, but most of these previously known forms of rod weeders include extensive drive trains and are not functional to automatically seek, generally, a predetermined operating depth independent of the operating depth of the associated ground preparation implement earthworking components. Further, most previously known forms of rod weeders which are partially functional to seek a predetermined operating depth include components subject to clogging by soil, requiring considerable maintenance and unable to predetermine a specific path of "floating movement." Accordingly, a need exists for an improved form of rod weeder which will be capable of automatically seeking a predetermined operating depth, which will not be subject to clogging and which utilizes a relatively simple drive train and which will afford a "floating movement" only along a specific predetermined path of movement.

Examples of previously known forms of rod weeders, including some of the general structural and operational features of the instant invention are disclosed in U.S. Pat. Nos. 2,596,270, 2,767,631, 2,886,113, 3,108,642, 3,186,494, 3,283,830, 3,360,053, 3,735,816, 3,768,425 and 4,171,723.

SUMMARY OF THE INVENTION

The rod weeder of the instant invention utilizes a hydraulic drive for each section of a multi-section cultivator assembly with which the rod weeder is functional and the hydraulic drive includes a hydraulic motor for each rod weeder section with multiple rod weeder sections being driven by a corresponding number of hydraulic motors connected together in series. In this manner, constant speed of operation of all of the rod weeders is maintained and multi-sections of a multi-section cultivator assembly equipped with the rod weeder of the instant invention may be folded relative to each other without disconnecting universal joints, and the like, normally utilized to connect adjacent rod weeder sections.

Further, the rod weeder of the instant invention enjoys a unique mounting assembly whereby each rod weeder section is automatically operative, generally, at a predetermined depth independent of the working depth of the associated groundworking components and whereby each rod weeder section cannot come out of the ground independent of raising the corresponding ground-working components.

It is also pointed out that the rod weeder is constructed in a manner whereby the drive components thereof are maintained relatively simple, whereby the structure by which the rod weeder is floatingly supported from the associated tool shanks is not subject to clogging by dirt and whereby the speed of rotation of the rod weeder relative to the operating depth thereof may be readily adjusted to perform a superior weeding operation. Further, because of this unique design the rod weeder may be used for incorporating chemical (both liquid and granular) sealing for anhydrous ammonia and sealing for granular fertilizer while banding. Also, rod direction may be reversed for better packing the soil in conjunction with air seeders, leveling, sealing and packing.

The main object of this invention is to provide an improved rod weeder constructed in a manner whereby the desired weeding operation may be performed in various soil conditions.

Another object of this invention is to provide a rod weeder constructed in a manner whereby the rod weeder shaft thereof is supported for vertical shifting relative to the associated tool shanks and the rod weeder shaft will automatically, generally, seek the proper working depth.

Still another important object of this invention, in accordance with the immediately preceding object, is to provide a rod weeder including multiple rod weeder sections and with the drive train for the multiple rod weeder sections being constructed in a manner whereby the speed of rotation of the rod weeder shaft sections may be precisely and simultaneously adjusted.

Still another object of this invention is to provide an improved rod weeder on multiple sections of a multi-section gang-type cultivator assembly and with the rod weeders of such construction to enable ready relatively swinging (folding) of adjacent cultivator sections.

Another object of this invention is to provide a rod weeder including structural features thereof which enable the rod weeder to be readily removably mounted upon an associated cultivator assembly, or other implement or combination of implements, including drills for seed bed preparation, whereby seeding, leveling and packaging while leaving the course material on top and bringing the fine material down to the seed may be accomplished in a single pass to promote earlier germination of the seed and a seeded bed less prone to erosion.

A final object of this invention to be specifically enumerated herein is to provide a rod weeder in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a rear elevational view similar to FIG. 1, but with the sections of the cultivator assembly relatively folded;

FIG. 5 is an enlarged fragmentary vertical sectional view taken substantially upon the plane indicated by the section line 5—5 of FIG. 2;

FIG. 6 is a perspective view of the improved connecting link utilized to swingably support the rod weeder relative to depending tool shank lower end portions;

FIG. 7 is a perspective view of one of the drag housings by which the associated rod weeder shaft section is rotatably journaled;

FIG. 8 is a partial exploded perspective view of the drive chain tensioning structure;

FIG. 9 is perspective view of one of the lower tool shank mounts by which the drive housing lower portion or a rod weeder shaft journal structure may be anchored relative to an associated tool shank lower end;

FIG. 10 is an enlarged horizontal sectional view taken substantially upon the plane indicated by the section line 10—10 of FIG. 5;

FIG. 11 is an enlarged fragmentary horizontal sectional view taken substantially upon the plane indicated by the section line 11—11 of FIG. 3;

FIG. 12 is an enlarged fragmentary vertical sectional view taken substantially upon the plane indicated by the section line 12—12 of FIG. 5; and FIG. 13 is a perspective view of a modified form of connecting link.

DETAILED DESCRIPTION OF THE PREFERRED EMBODIMENTS

Figure 1:
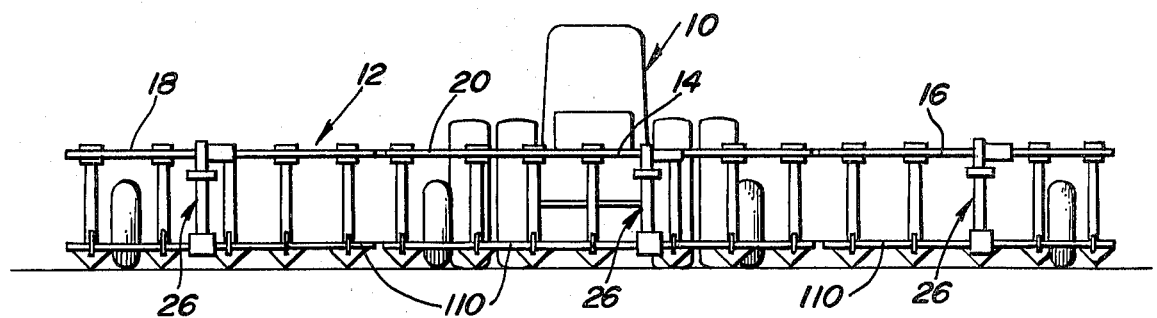
FIG. 1 is a rear elevational view of a multi-section, gang-type cultivator assembly operatively connected to a farm tractor and incorporating the rod weeder of the instant invention.

Referring now more specifically to the drawings, the numeral 10 generally designates a conventional form of tractor behind which a conventional multi-section, gang-type cultivator assembly referred to in general by the reference numeral 12 is operatively connected. The cultivator assembly 12 includes a center section 14 and a pair of opposite side wing sections 16 and 18 which may be swung between the extended positions thereof illustrated in FIG. 1 and the folded positions thereof illustrated in FIG. 4.

Each of the sections 14, 16 and 18 includes a tool bar 20 from which a plurality of spring shanks or tines 22 are dependingly supported, the lower ends of the spring shanks or tines 22 having shovel sweeps 24 removably mounted thereon.

The rod weeder of the instant invention is used in multiples thereof on the cultivator assembly 12 with a rod weeder supported from each cultivator section. Each section of the cultivator assembly 12 includes a closed upstanding drive housing referred to in general by the reference numeral 26 including front and rear sides 28 and 30. Opposite side panels 32 and 34 extend between the front and rear sides 28 and 30 and the upper and lower ends of the housing 26 are closed by upper and lower wall portions 36 and 38.

The opposite side panels 32 and 34 include forwardly projecting mounting lugs 40 adjacent their upper end portions and the rear end of a first upper support link 42 is pivotally supported between the mounting lugs 40 by a pivot fastener 44. The forward end of the support link 42 is pivotally supported between a corresponding pair of mounting lugs 46 comprising integral components of a clamp assembly 48 clampingly engaged with the upper end of an associated shank 22. A pivot fastener 50 is secured through the forward of the link 42 and the mounting lugs 46.

The lower end portions of the side panels 32 and 34 of the housing 26 include a second pair of forwardly projecting mounting lugs 52 provided with three vertically spaced pairs of registered apertures 54 formed therethrough and the rear end of a drag link 56 is pivotally supported between the mounting lugs 52 through the utilization of a pivot fastener 58 passing through the rear end of the drag link 56 and one pair of the bores 54. The lower end of the shank 22 associated with the housing 26 has a rearwardly and downwardly opening bracket 60 supported therefrom. The bracket 60 includes a forward arcuate wall 62 which conforms to and abuts the rear surface of the lower end of the shank 22, a pair of opposite side plates 64 having registered transverse bores 66 formed therethrough a small top wall and a partial bottom wall portion 68 whose forward end is inclined upwardly and abuts and is secured to the rear surface of the forward wall 62. A pair of fasteners 70 are secured through the rearwardly opening shank portion of the sweep 24 and suitable bores (not shown) formed through the forward wall 62 above and below the forwardly and upwardly inclined forward portion of the bottom wall portion 68. The forward end of the drag link 56 is pivotally anchored between the rear ends of the side plates 64 of the bracket 60 through the utilization of a pivot fastener 72. Also, it will be noted that the drag link 56 includes a depending tang portion 74 disposed between the forward ends of the mounting lugs 52.

The upper end portion of the housing 26 has a hydraulic motor 76 mounted thereon and the drive motor 76 includes an output shaft 78 projecting into and journaled from the side plates of the housing 26 and having a sprocket wheel 80 mounted thereon. In addition, the lower end of the housing 26 rotatably journals a horizontal transverse output shaft 82 and the portion of the output shaft 82 disposed within the housing 26 has a sprocket wheel 84 mounted thereon for rotation therewith. An elongated endless chain 86 is trained about the sprocket wheels 80 and 84 and thus drivingly connects the sprocket wheel 80 to the sprocket wheel 84.

The inner surfaces of the upper rear portions of the side plates 32 and 34 have horizontally and rearwardly opening U-shaped plates 88 secured thereto and a bifurcated mounting block 90 is slidingly received between the side plates 32 and 34 and within the confines of the U-shaped plates 88. The mounting block 90 includes a pair of laterally spaced forwardly projecting arms 92 having registered transverse bores 94 formed therein which receive the opposite ends of a support shaft 96 therethrough having a chain tensioning sprocket 98 journaled thereon, the shaft 96 being secured in one of the arms 92 through the utilization of a threaded set screw 100 threadedly engaged in a corresponding bore 102 formed in the associated arm 92. The rear end of the mounting block 90 includes a rearwardly projecting positioning stud 104 over which the forward end of a compression spring 106 is removably telescoped and the rear end of the spring 106 engages the opposing inner surface of the rear side 30 of the housing 26. Thus, the compression spring 106 yieldingly biases the mounting block 90 and the sprocket wheel 98 journaled therefrom forwardly to maintained tension on the rear reach of the chain 86. The stud 104 serves as a locator for the forward end of the spring 106 and also as a stop to maintain tension on the chain when the direction of rotation of the associated motor 76 is reversed.

Opposite ends of the shaft 82 are provided with universal joints 108 and the adjacent ends of a pair of non-circular rod weeder shafts 110 are supported from the universal joints 108. Each depending shank 22 spaced laterally of the housing 26 includes a bracket corresponding to the bracket 60 and each of these additional brackets 60 pivotally supports the forward end of an additional drag link 56. The rear ends of the additional drag links 56 each are pivotally supported between a pair of mounting lug defining forward end portions 112 of the opposite side plates of a corresponding drag bearing housing 113. The forward end portions 112 include three vertically spaced bores 114 corresponding to the bores 54 formed therethrough and fasteners 116 and 118, corresponding to fasteners 72 and 58, pivotally support the additional links 56 from the additional brackets 60 and the drag bearing housings 113. The forward ends of the lugs 52 and end portions 112 are abuttingly engageable with the rear ends of the plates 64 to limit upward and downward swinging of each housing 26 and drag bearing housings 113 and thus prevent the rod weeder shafts 110 from kicking upwardly out of the ground.

The drag bearing housings 113 each comprise a pair of opposite side plates 120 between which a pair of bearing assemblies 122 are secured through the utilization of suitable fasteners 124. The bearing assemblies 122 rotatably receive a sleeve 126 therethrough and each sleeve 126 has a non-circular opening 128 formed therethrough in which a corresponding portion of the associated rod weeder shaft 110 is slidably received. The forward end portions 112 comprise reinforced forward end portions of the plates 120.

With attention now invited more specifically to FIG. 13 of the drawings, there may be seen a modified form of drag link 56'. The drag link 56' may be considered as substantially identical to the drag link 56, except that the effective length of the drag link 56' is greater than the effective length of the drag link 56.

Figure 2:
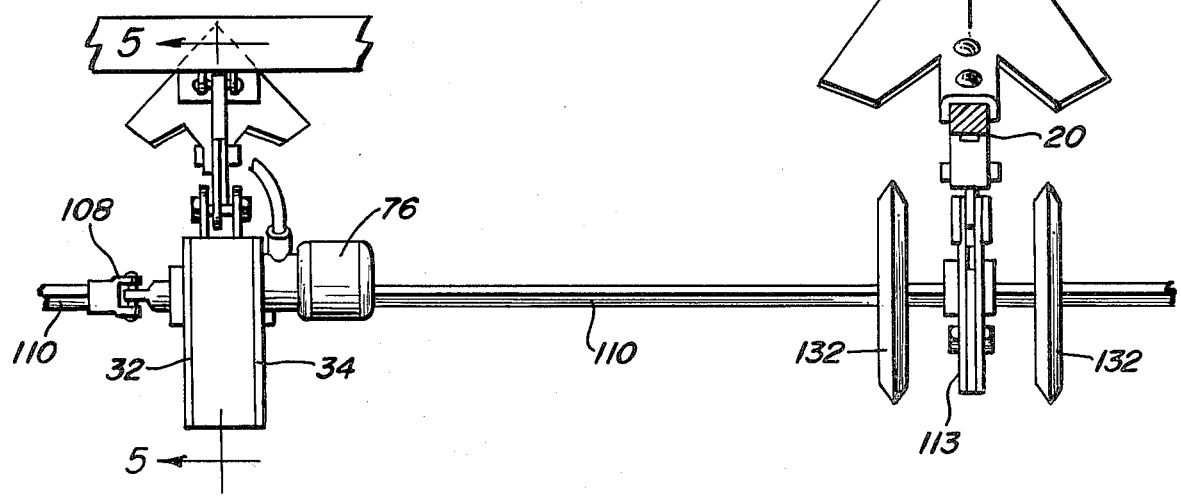
FIG. 2 is an enlarged fragmentary top plan view of the rod weeder on somewhat of an enlarged scale and with portions of the cultivator illustrated in the right hand portion of FIG. 2 being broken away and illustrated in horizontal section.
Figure 3:
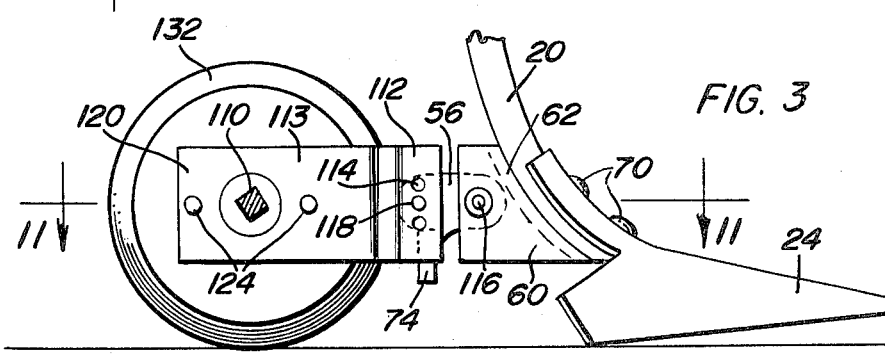
FIG. 3 is an enlarged end elevational view of the structure illustrated in the right hand portion of FIG. 2 as seen from the right side thereof.

With attention now invited more specifically to FIGS. 2, 3 and 11 of the drawings, it may be seen that each rod weeder shaft 110 may include a pair of packer wheels 132 thereon equally spaced on opposite sides of each housing 113. The spacing between the packer wheels 132 and the housings 113 may vary as desired, the packer wheels 132 including structure (not shown) whereby they may be keyed to the shafts 110 against sliding movement therealong.

The tangs 74 and 74' oscillate back and forth between the mounting lugs 52 and the forward end portions 112 of the plates 120 in order to prevent the build-up of dirt or trash therebetween. Accordingly, the housings 26 and 113 are free to "float" vertically relative to the shanks 22. The fluid motors 76 are connected in series from a suitable source of hydraulic fluid under pressure provided on the tractor 10. Accordingly, the shafts 78 and 82 rotate at the same speed and the supply of fluid under pressure to the motors 52 may be controlled by any suitable tractor mounted control (not shown). Further, the aforementioned tractor mounted control may be of a type such that reverse operation of the motors 52 at variable speeds is also possible. In this manner, controlled depth of the shafts 110 may be effected when encountering different types of soil conditions. Further, in view of the ability of the shafts 110 to support the packer wheels 132 therefrom, the assembly 12 including the rod weeder and the packer wheels 132 may be utilized to weed a field and pack seed in the same operation. Further, a field may be weeded and prepared for seeding in a single operation or a field may be weeded, banded with fertilizer and have the soil prepared for seed in a single pass. Additionally, the latter operation may also be simultaneously carried out in conjunction with packing of the seed bed. Also, due to the design of the bracket 60 and the use of the drag links 56 and 56' whatever press is required for a seeding operation may be applied by utilizing selected bores 114 and the weight of the assembly 12. Further, the use of a limited floating action for the mount of the rod weeder shafts 110 enables the invention to be used in rocky fields.

When considering the increased cost of machinery, such as tractors, wing cultivators, seeders and fertilizing assemblies, as well as the increases in cost of fuel to operate farm tractors, the over-all assemblage of the instant invention may realize not only a considerable savings in man hours, but also considerable savings in the cost of machinery, inasmuch as a larger area of ground may be prepared, seeded, fertilized and packed in a single operation by a single person operating a single over-all unit. In such an instance, less equipment is needed because three or four operations may be performed at one time and an entire acreage may have three or four operations performed thereon in a short period of time allowed by weather conditions. Thus, duplication of machinery and machine operators is not required to complete multiple operations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An implement including a tool bar, a plurality of tool shanks dependingly supported from said tool bar and spaced therealong, a floating rod weeder assembly including an upstanding housing having upper and lower ends, first support means supporting said upper and lower ends behind a first of said tool shanks for limited vertical shifting relative to said first shank, powered output shaft means journaled from the lower end of said housing for rotation about a horizontal axis paralleling said tool bar, a rod weeder shaft having one end supported from and driven by said power output shaft, journal means mounted on said rod weeder shaft and spaced axially therealong from said powered output shaft, and second support means supporting said journal means rearwardly of and from a second of said tool shanks for limited vertical shifting relative to said second shank, said first and second means including means supporting said housing and journal means relative to the associated shanks for limited oscillation about axes spaced horizontally forward of said housing lower end and said journal means, said first and second means including front-to-rear extending support links pivotally anchored relative to the corresponding shanks at their front ends between rearwardly projecting mounting lug portions carried by said corresponding shanks and pivotally anchored to said housing and journal means at their rear ends between pairs of laterally spaced mounting lug portions carried by said housing and journal means, said support links including depending tang portions spaced slightly forward of the rear ends of said links and oscillatable between the pairs of forwardly projecting mounting lugs carried by said housing and journal means.

2. The implement of claim 1 wherein said upper end of said housing supports a power input shaft and a hydraulic motor drivingly connected to said power input shaft, said power input shaft and said powered output shaft including portions thereof disposed within said housing, drive and driven wheels carried by said power input shaft and powered output shaft, elongated endless flexible drive means trained about said drive and driven wheels, an idler wheel journaled in said housing and adjustably shiftable laterally of a plane containing said power input shaft and powered output shaft, one reach of said endless flexible drive means extending between said power input shaft and powered output shaft being passed about and deflected by said idler wheel, said idler wheel being journaled from a support block, said housing including opposite side plates having inwardly projecting guides supported therefrom and extending along paths paralleling the path of lateral shifting of said idler wheel, said idler wheel being slidably received between said guides.

3. The implement of claim 1 wherein said pairs of laterally spaced mounting lugs carried by said housing and journal means include vertically spaced pairs of registered transverse bores formed therethrough, the rear ends of said links being pivotally connected between the last mentioned mounting lugs by pivot fastener means passed through the rear ends of said links and selected pairs of said bores.

4. The implement of claim 1 wherein said implement includes a plurality of gang sections with each of said gang sections including a tool bar and a set of cultivator tool shanks dependingly supported therefrom, each set of tool shanks having an upstanding housing supported therefrom behind a first tool shank of that set of shanks and each set of shanks including a second shank having journal means supported therefrom axially spaced from the associated housing, each of said housings including a power input shaft and a powered output shaft and each of said sets of shanks including a rod weeder shaft supported from the corresponding powered output shaft and associated journal means and driven by the corresponding powered output shaft, each of said housings supporting a fluid motor therefrom drivingly connected to the corresponding power input shaft, said fluid motors being connected in series within a hydraulic circuit.

5. The implement of claim 4 wherein said gang sections are mounted from each other for relative angular displacement about generally horizontal front-to-rear extending axes.

6. The implement of claim 1 wherein each of said tool shanks includes a shovel sweep supported from the lower end thereof.

7. The implement of claim 1 including packer wheels mounted on said rod weeder shaft axially spaced from and on opposite sides of said journal means.

8. The implement of claim 7 including earth working means carried by the lower ends of said tool shanks.

9. An implement including a tool bar, a plurality of tool shanks dependingly supported from said tool bar and spaced therealong, a floating rod weeder assembly including an upstanding housing having upper and lower ends, first support means supporting said upper and lower ends behind a first of said tool shanks for limited vertical shifting relative to said first shank, powered output shaft means journaled from the lower end of said housing for rotation about a horizontal axis paralleling said tool bar, a rod weeder shaft having one end supported from and driven by said power output shaft, journal means mounted on said rod weeder shaft and spaced axially therealong from said powered output shaft, and second support means supporting said journal means rearwardly of and from a second of said tool shanks for limited vertical shifting relative to said second shank, a pair of packer wheels mounted on said rod weeder shaft for rotation therewith on opposite sides of each of said shanks, said upper end of said housing supporting a power input shaft and a hydraulic motor drivingly connected to said power input shaft, said power input shaft and said powered output shaft including portions thereof disposed within said housing, drive and driven wheels carried by said power input shaft and powered output shaft, elongated endless flexible drive means trained about said drive and driven wheels, an idler wheel journaled in said housing and adjustably shiftable laterally of a plane containing said power input shaft and powered output shaft, one reach of said endless flexible drive means extending between said power input shaft and powered output shaft being passed about and deflected by said idler wheel, said idler wheel being journaled from a support block, said housing including opposite side plates having inwardly projecting guides supported therefrom and extending along paths paralleling the path of lateral shifting of said idler wheel, said idler wheel being slidably received between said guides, said first and second means including means supporting said housing and journal means relative to the associated shanks for limited oscillation about axes spaced horizontally forward of said housing lower end and said journal means, said first and second means including front-to-rear extending support links pivotally anchored relative to the corresponding shanks at their front ends between rearwardly projecting mounting lug portions carried by said corresponding shanks and pivotally anchored to said housing and journal means at their rear ends between pairs of laterally spaced mounting lug portions carried by said housing and journal means, said support links including depending tines spaced slightly forward of the rear ends of said links and oscillatable between the pairs of forwardly projecting mounting lugs carried by said housing and journal means.

* * * * *